April 19, 1949.    H. HUTCHINGS    2,467,483
AGRICULTURAL TRACTOR

Filed Dec. 9, 1946    2 Sheets-Sheet 1

Inventor
Herschel Hutchings,
By J. Stanley Burch
Attorney

April 19, 1949.                H. HUTCHINGS                2,467,483
                            AGRICULTURAL TRACTOR
Filed Dec. 9, 1946                                    2 Sheets-Sheet 2

Inventor
Herschel Hutchings,

By Stanley Burch
Attorney

Patented Apr. 19, 1949

2,467,483

UNITED STATES PATENT OFFICE 2,467,483

AGRICULTURAL TRACTOR

Herschel Hutchings, Lubbock, Tex.

Application December 9, 1946, Serial No. 714,953

1 Claim. (Cl. 180—1)

This invention relates to an improved agricultural tractor of the type shown in my U. S. Letters Patent No. 2,404,442, dated July 23, 1946, wherein provision is made to enable the driver to view the row or ground between the sides of the tractor directly rearwardly of the power plant.

In accordance with the present invention, the propeller shaft is offset to one side of the longitudinal center of the tractor, the transmission assembly is directly connected with the differential assembly, the transmission assembly and the power plant are located at or near said longitudinal center, and gearings are provided respectively between the power plant and the forward end of the propeller shaft and between the rear end of the propeller shaft and the transmission assembly. A transverse bracket plate secured on the side frame rails supports the front end of the transmission assembly, and brackets of the standard type support the propeller shaft upon and above one side frame rail.

The exact nature of the present invention will become apparent from the following description when considered with the accompanying drawings, in which.

Figure 1:
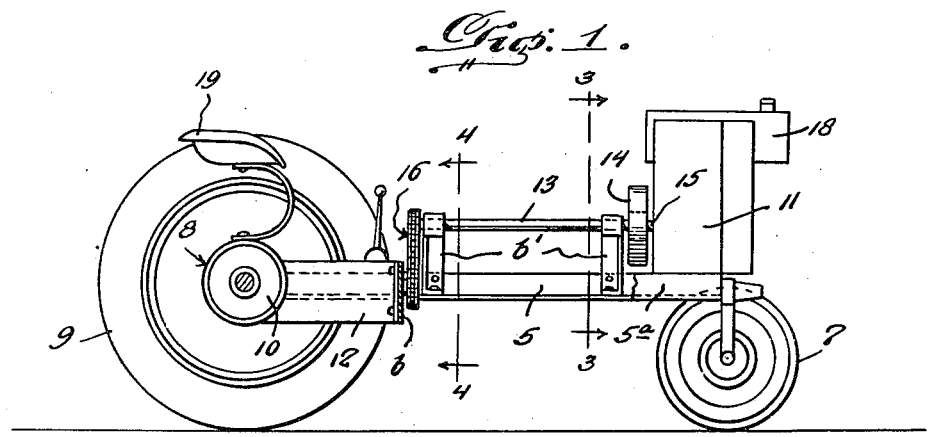
Figure 1 is a view, partly in side elevation and partly broken away and in section, of a tractor embodying the present invention.
Figure 3:
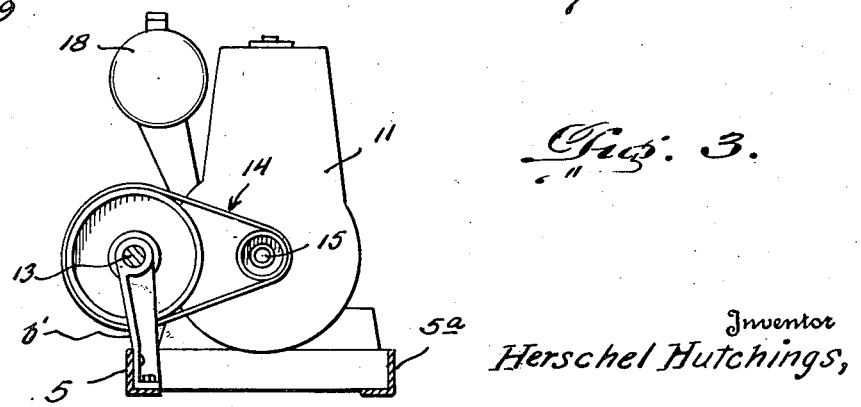
Figure 4:
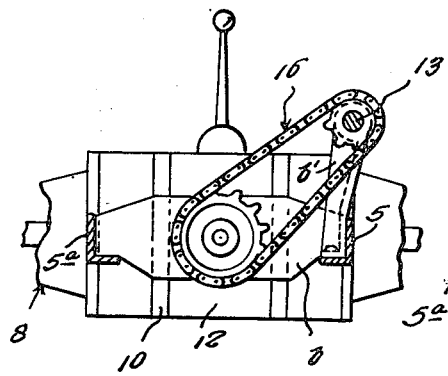

Figures 3 and 4 are enlarged transverse sections taken respectively on line 3—3 and line 4—4 of Figure 1.

Figure 2:
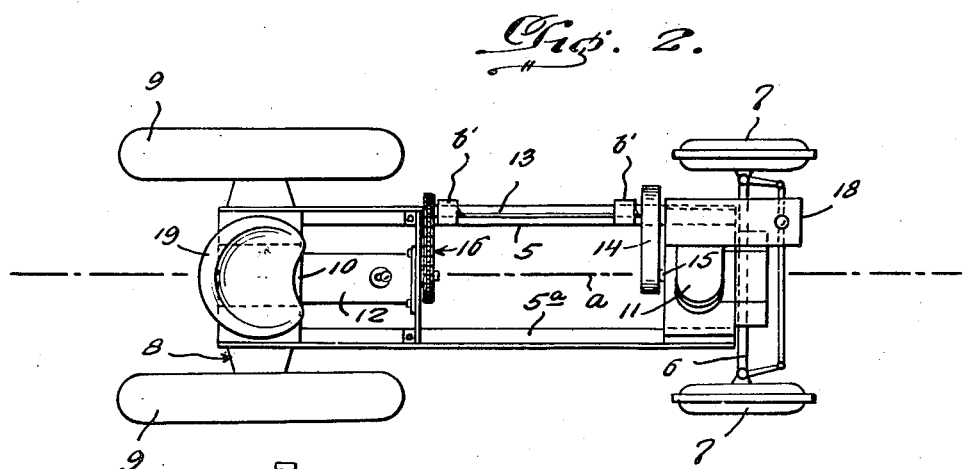
Figure 2 is a top plan view of the tractor shown in Figure 1.
Figure 5:
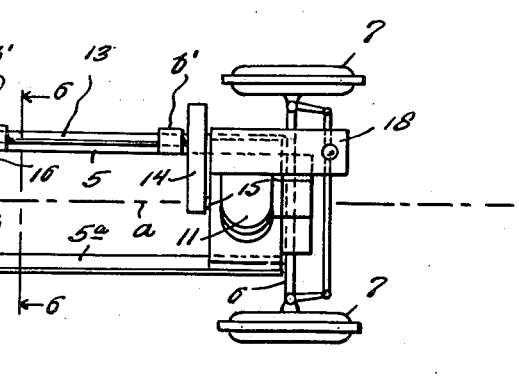

Figure 5 is a view similar to Figure 2, showing a modification.

Figure 6:
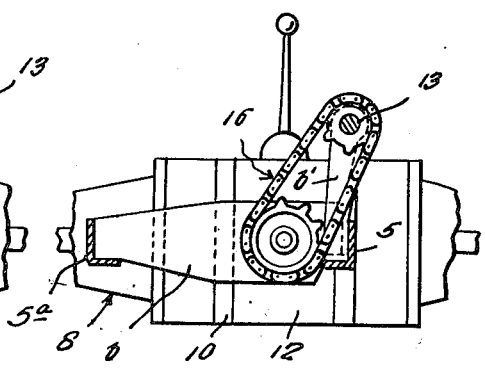

Figure 6 is an enlarged transverse section taken on line 6—6 of Figure 5.

Referring in detail to the drawings, the invention includes side frame rails 5 and 5a, supported at their forward ends on a front axle 6 having front steering and supporting wheels 7, and supported at their rear ends upon a rear axle structure 8 which includes spaced rear drive wheels 9 and a differential assembly 10 located at the longitudinal center a of the tractor as shown in Figure 2, or near but to one side of said center as shown in Figure 5. A power plant 11 is supported by the forward end portions of the rails 5 and 5a centrally between the wheels 7.

The tractor also includes a transmission assembly 12 directly connected with the differential assembly 10, and a propeller shaft 13 offset to one ide of the center a. The front end of assembly 12 is supported by a transverse bracket plate b secured upon the rails 5 and 5a, and the shaft 13 is supported by brackets b' above the rail 5. The brackets b' are in the form of standards secured on the rail 5.

A belt or other suitable gearing 14 operatively connects the drive shaft 15 of power plant 11 with the forward end of propeller shaft 13, and a sprocket or other suitable gearing 16 operatively connects the rear end of shaft 13 with the drive shaft of transmission assembly 12. By placing the assembly 12 at the center a as in Figure 2, a structure which is nearly balanced transversely is had. However, by locating the assembly 12 near but to one side of the center a as in Figure 5, better vision of the ground along the center a is had. Otherwise, the forms of Figures 2 and 5 are alike.

The fuel storage tank is shown at 18, and a driver's seat 19 is supported on the structure 8 between the wheels 9.

It will be seen that the driver occupying the seat 19 may clearly view the row along the line a between the rails 5 and 5a directly behind the power plant 11.

What I claim is:

An agricultural tractor including an open frame having side rails and provided with front steering and supporting wheels, a power plant supported by the forward end of the frame centrally between said wheels and having a rearwardly extending drive shaft disposed substantially midway between said side rails, a rear axle structure supporting the rear end of the frame and including rear drive wheels and a differential assembly, a propeller shaft supported by and above one of said side rails to one side of the longitudinal center of the tractor, a transmission assembly disposed in front of and connected directly with said differential assembly between the side rails, a gearing connecting the drive shaft of the power plant with the forward end of said propeller shaft, a second gearing connecting the rear end of the propeller shaft with the drive shaft of the transmission assembly, a driver's seat supported on said rear axle structure between the drive wheels, and a transverse bracket plate extending between and secured on said side rails and supporting the front end of said transmission assembly.

HERSCHEL HUTCHINGS.

REFERENCES CITED

The following references are of record in the file of this patent:

UNITED STATES PATENTS

| Number | Name | Date |
|---|---|---|
| 913,250 | Bailey | Feb. 23, 1909 |
| 1,546,708 | Booth | July 21, 1925 |
| 2,046,429 | Ronning | July 7, 1936 |
| 2,261,354 | Fee | Nov. 4, 1941 |
| 2,404,442 | Hutchings | July 23, 1946 |